UNITED STATES PATENT OFFICE 2,418,501

ALKOXY BENZOATES OF N(HYDROXY ETHYL) AND N(HYDROXY PHENETHYL) SUBSTITUTED AMINO ALCOHOLS

Walter G. Christiansen, Glen Ridge, and Sidney E. Harris, Nutley, N. J., assignors to E. R. Squibb & Sons, New York, N. Y., a corporation of New York No Drawing. Original application September 9, 1937, Serial No. 163,034. Divided and this application June 28, 1944, Serial No. 542,620

5 Claims. (Cl. 260—473)

This application is a division of our application Serial No. 163,034, filed September 9, 1937.

This invention relates to, and has for its object the provision of, certain amino-alcohol esters of oxy-benzoic acids, and acid-addition salts thereof. These esters have the general formula

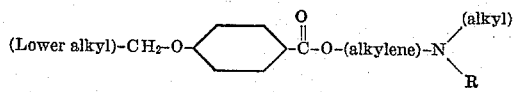

wherein R represents a member of the group consisting of hydroxy-alkyl and hydroxy-aralkyl.

The compounds of this invention are valuable therapeutic agents, being particularly effective for inducing local anesthesia.

In the practice of this invention, an aracyl halide of the general formula

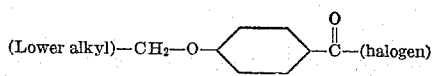

is reacted with an alcohol of the formula

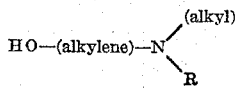

wherein R has the above-designated meaning, to produce the desired ester. However, other methods hereinafter described may be employed to produce the compounds of the present invention.

The amino-esters of this invention are generally recovered in the form of their addition-salts with hydrochloric acid. However, other acids forming addition salts with amines may be used in place of hydrochloric; such acids are boric, nitric, lactic, tartaric, citric, phosphoric, sulfuric, picric, and picrolonic. The addition-salts may be converted into the free bases in the usual manner.

The following examples are illustrative of the invention:

EXAMPLE 1

β-[N-ethyl-N-(β-hydroxyethyl)-amino]-ethyl ester of p-ethoxy-benzoic acid 6.7 g. of β,β'-dihydroxy-triethylamine is dissolved in 100 cc. of dry benzene; 14 g. of potassium carbonate is suspended therein, and after adding 9.2 g. of p-ethoxy-benzoyl chloride the reactants are refluxed, with stirring, for two hours. Filtering the reactants, evaporating the benzene, and distilling the residue in vacuo yields the desired product as a thick, colorless oil, soluble in dilute acids, and having a boiling point of 218–225° C./8 mm. Its hydrochloride is very hydroscopic.

EXAMPLE 2

β-[N-ethyl-N-(β-hydroxyethyl)-amino]-ethyl ester of p-n-butoxy-benzoic acid

This compound is obtained in the same manner as that of Example 1, except that p-n-butoxy-benzoyl chloride is used instead of the p-ethoxy-benzoyl chloride and the amount of the ethyl diethanolamine used is 7 g. The desired product has a boiling point of 216–220° C./3 mm. Its hydrochloride is hygroscopic.

EXAMPLE 3

β-[N-ethyl-N-(β-phenyl-β-hydroxy-ethyl)]-amino-ethyl ester of p-ethoxy-benzoic acid A mixture comprising 9.95 g. of phenacyl bromide, 4.4 g. ethylaminoethanol and 100 cc. benzene is refluxed for three hours. On adding 10 g. potassium carbonate a vigorous evolution of carbon dioxide ensues. The suspension is then further refluxed for four hours, the mixture of potassium bromide and potassium carbonate filtered off, and the filtrate treated with a solution of hydrogen chloride in ether. The reddish brown semisolid which separates out crystallizes, and is filtered off, washed with ether and dried in a vacuum over calcium chloride. The extremely hygroscopic substance formed is N-phenacyl-N-ethyl-amino-ethanol hydrochloride.

A mixture comprising 7.28 g. of N-phenacyl-N-ethyl-amino-ethanol, 7.5 g. p-ethoxy-benzoyl chloride, 30 cc. benzene and 8 g. potassium carbonate is stirred and refluxed for five hours, filtered, and the filtrate treated with a solution of hydrogen chloride in ether. The impure material is then purified by crystallization from a chloroform-petroleum ether mixture. The white crystalline substance obtained is the N-phenacyl-N-ethyl-amino-ethyl ester of p-ethoxy-benzoic acid (hydrochloride).

0.9 g. of the above hydrochloride is dissolved in 60 cc. alcohol containing 0.3 g. platinum oxide. The mixture is shaken for eight hours under a pressure of 35 pounds of hydrogen; it is then filtered, the filtrate concentrated to a small volume and diluted with ether. The brownish-white crystalline substance is filtered off, washed with ether and dried in a vacuum over calcium chloride. The substance is β-[N-ethyl-N-(β-phenyl-β-hydroxy-ethyl)]-amino-ethyl ester of p-ethoxy-benzoic acid (hydrochloride).

The invention may be variously otherwise embodied, within the scope of the appended claims.

We claim:

1. A compound of the group consisting of amino-esters of the general formula

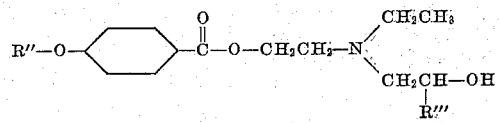

wherein R'' represents an alkyl residue with 2 to 4 carbon atoms, and R''' represents a member of the group consisting of hydrogen and phenyl; and acid-addition salts thereof.

2. An acid-addition salt of a compound of the general formula

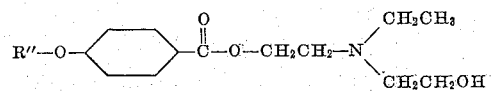

wherein R'' represents an alkyl residue with 2 to 4 carbon atoms.

3. The hydrochloride of β-[N-ethyl-N-(β-hydroxyethyl)-amino]-ethyl p-ethoxy-benzoate.

4. The hydrochloride of β-[N-ethyl-N-(β-hydroxyethyl)-amino]-ethyl p-n-butoxy-benzoate.

5. The hydrochloride of β-[N-ethyl-N-(β-phenyl-β-hydroxyethyl)]-amino-ethyl p-ethoxy-benzoate.

WALTER G. CHRISTIANSEN.
SIDNEY E. HARRIS.

REFERENCES CITED

The following references are of record in the file of this patent:

UNITED STATES PATENTS

| Number | Name | Date |
| --- | --- | --- |
| 2,103,266 | Lott | Dec. 28, 1937 |
| 1,193,650 | Wildman | Aug. 8, 1916 |

OTHER REFERENCES

Rohmann et al., "Archiv. der Phormazie," vol. 274 (1936), pgs. 110–126.